Nov. 26, 1957   J. MULLER   2,814,352
ENGINE SUSPENSION FOR MOTOR VEHICLES
Filed May 15, 1953   2 Sheets-Sheet 1

Inventor
Josef Müller
By Hicke, Padden + Craig
Attorneys

Nov. 26, 1957  J. MULLER  2,814,352
ENGINE SUSPENSION FOR MOTOR VEHICLES
Filed May 15, 1953  2 Sheets-Sheet 2
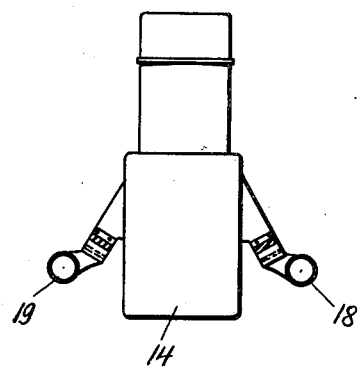
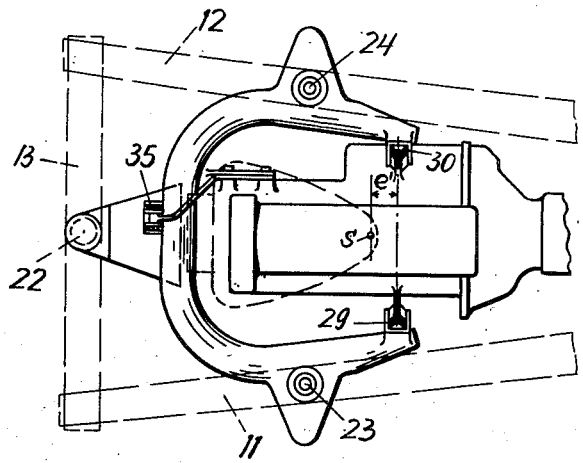
Inventor
Josef Müller
BY Wicke Padlon & Craig
Attorneys United States Patent Office 2,814,352
Patented Nov. 26, 1957

2,814,352
ENGINE SUSPENSION FOR MOTOR VEHICLES

Josef Muller, Stuttgart, Germany, assignor to Daimler-Benz Aktiengesellschaft, Stuttgart-Unterturkheim, Germany Application May 15, 1953, Serial No. 355,382

Claims priority, application Germany May 17, 1952

7 Claims. (Cl. 180—64)

The present invention relates to a suspension of a driving aggregate, for instance, of an engine or an engine-transmission assembly, on a sub-frame connected to the main frame or another section, for instance, of the body of the vehicle, wherein elastic bumpers are preferably inserted between the sub-frame and the main frame.

An object of the present invention is a suspension of the driving aggregate on the sub-frame so that the full amount of weight of the aggregate will substantially be transmitted directly to the road wheels by way of the sub-frame, that is, without being transmitted through the main frame structure such as the main frame or body, and thus will act as a damping mass so as to prevent as much as possible the transmission of noises originating in the road wheels to the main frame structure.

Another object of the present invention is a construction of the sub-frame allowing a facilitated assembling of the driving aggregate.

According to another object of the present invention the sub-frame is U-shaped, that is, forked or horseshoe-shaped, so as to embrace, and to carry or to support respectively the driving aggregate which is mounted only on the prongs or the forked ends of the sub-frame, on the one hand, and on the cross member or the fork handle, on the other hand, so as to be removable from the vehicle preferably along with the driving aggregate.

Another object of the present invention consists in that the driving aggregate, on the one hand is mounted on the sub-frame in a plane passing about through the center of gravity and, on the other hand, is elastically supported on the sub-frame only at its end preferably opposite the output side.

Another object of the present invention is a U-shaped or forked construction of the sub-frame, particularly in combination with a forked construction of the main frame, so that the driving aggregate can be mounted between the branches or the forked arms of the sub-frame or of the main frame respectively, so as to have its center of gravity located particularly low.

Other features, characteristics, and advantages, of the present invention will become more obvious from the following description when taken in connection with the accompanying drawing which shows, for purposes of illustration only, several embodiments of the present invention and wherein Figure 1 is a side elevational view of an engine suspension in accordance with the present invention.

Figure 3 is a front elevational view of the side suspension points of the engine taken along lines 3—3 of Figure 1, and Figure 4 is a plan view of another embodiment in accordance with the present invention similar to Figure 2.

Figure 1:
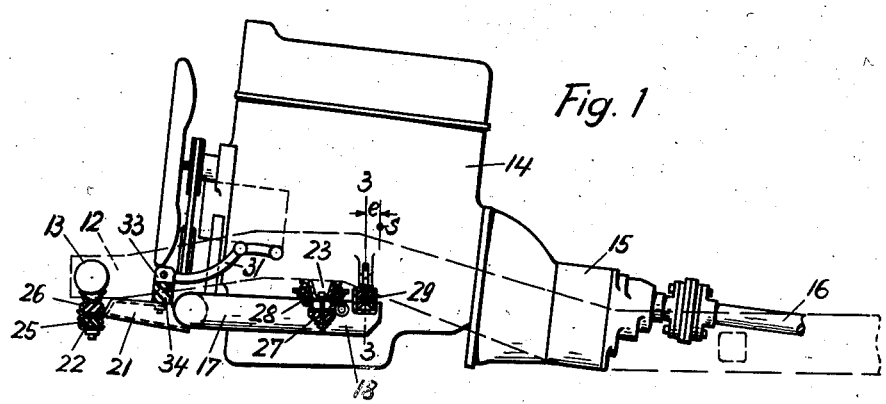
Figure 2:
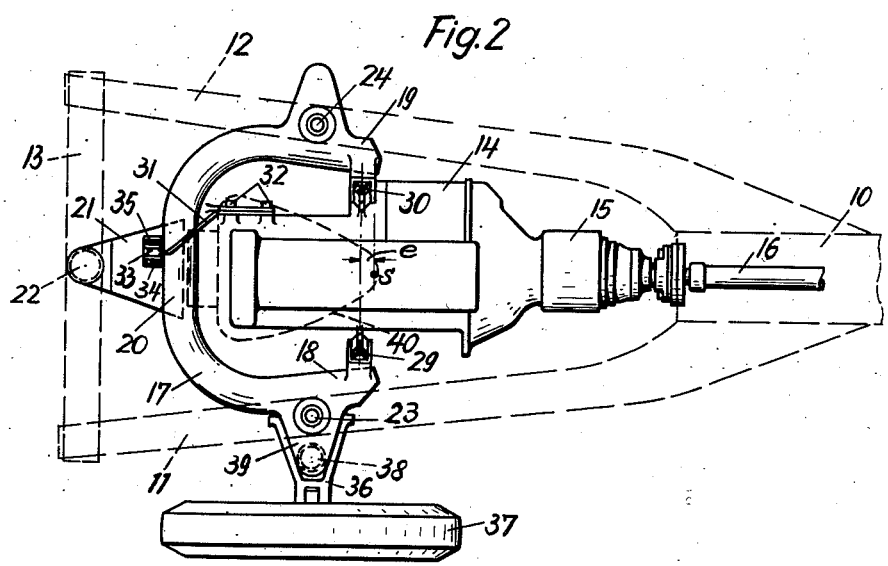
Figure 2 is a plan view of the suspension shown in Figure 1 in accordance with the present invention omitting, for the sake of clarity, the driving and supporting arrangement for the fan.

Referring now to the drawing wherein like reference numerals are used throughout the various views to designate like parts, and more particularly to Figures 1 and 2, reference numeral 10 designates the forked main frame, between the two forked ends of which the cross member 13 is provided. The driving aggregate, consisting essentially of the engine 14 and the transmission 15 driving the rear wheels through the cardan shaft 16, is mounted at the main frame by the intermediary of a sub-frame as follows: The auxiliary or sub-frame 17 is U-shaped or forked and substantially consists of a U-shaped bent tubular carrier or bearer member, whose two branches or arms 18 and 19 embrace the engine 14 from in front thereof, and at whose cross member 20 a bracket 21 is welded on. In three points 22, 23 and 24 the sub-frame is suspended at the main frame, each suspension point being provided with two pressure-stressed rubber bumpers stressed in compression to prevent a metallic contact of the sub-frame with the main frame. Thus Fig. 1 shows the rubber bumpers 25, 26 arranged at point 22 connecting the bracket 21 of the sub-frame with the cross member 13 of the main frame, whereas for connecting the branch ends 18, 19 with the forked ends 11, 12 of the main frame there are provided two rubber bumpers 27, 28 each. The front wheels 37 are guided at the arms or branch ends 18, 19 of the U-shaped sub-frame in a vertically slewable manner independent from each other by means of swinging axle members, for instance, two arms or link-members arranged above each other, an upper arm 36 being shown in Fig. 2, and at 38 suspended by springs, e. g., coil springs abutting with their lower ends against the lower link member and with their upper ends against the side brackets 39 at the arms 18, 19 of the sub-frame. Reference numeral 40 designates the lower oil sump of the motor which is substantially triangular in shape. In order to show more clearly the auxiliary front mounting of the motor or engine on the auxiliary or sub-frame, the drive mechanism and support mechanism of the fan have been omitted in Figure 2.

The engine-transmission assembly 14, 15 is suspended on the sub-frame by means of tangentially stressed rubber bumpers 29, 30 which have their respective shearing planes perpendicular to the longitudinal axis of the engine, and which in the example of construction according to Figures 1–3 are located just ahead of the center of gravity S by a distance e between the vertical transverse plane containing the center of gravity and the plane containing the bumpers 29 and 30, so that the weight of the engine-transmission assembly which is effective through the center of gravity works with a leverage in relation to the suspension points 29, 30 of the engine. For taking up the torque, a bent arm 31 is laterally fixed at the front of the engine by means of screws 32. The arm is bent outwardly toward the longitudinal center plane of the engine and is connected with the bracket 21 of the sub-frame in the support point by means of rubber disks 34, 35 tangentially stressed toward the top, the shearing planes of the rubber disks running parallel to the longitudinal axis of the engine and perpendicular to the road surface.

In that case, the weight G of the engine-transmission assembly acting through the center of gravity is directly transmitted to the road wheels in the full amount thereof or with an upward leverage, by way of the branches 18 and 19 of the sub-frame and by-passing the main frame structure, because the weight of the driving aggregate is supported on the auxiliary frame outside the support area defined by points 22, 23, and 24, and more particularly at a distance from the vertical transverse plane passing through the support point 22 which is greater than the distance between the vertical transverse plane through the support of springs 38 on the auxiliary frame and the first-mentioned vertical transverse plane. In that way, rapid oscillations and vibrations at the road wheels and noises caused by driving are prevented from being transmitted to the vehicle body by the mass of the driving aggregate.

In the example of construction according to Fig. 4 the support points 29 and 30 are arranged behind the transverse plane passing through the center of gravity S, so that the weight G acting through the center of gravity S has a lever arm $e'$ in relation to the support points 29 and 30. Therefore, in contrast to the example of construction according to Figs. 1 and 2, there occurs in the rubber members 34 and 35 of the support point 33 a shearing force acting downward instead of a shearing force acting upward.

Of course, the center of gravity S may also directly lie in a vertical transversal plane passing through the support points 29, 30.

The present invention is not restricted to the illustrated examples of construction, but may at will be varied within the scope of the individual features of the present invention.

What I claim is:

1. In a motor vehicle a main frame, an auxiliary frame, means for elastically connecting said auxiliary frame with said main frame in a first vertical transverse plane, means for elastically connecting said auxiliary frame with said main frame in a second vertical transverse plane spaced from said first plane, a pair of wheels opposite each other on different sides of the vehicle, means for supporting said wheels against said auxiliary frame in a third vertical transverse plane, a drive aggregate for the vehicle, means for elastically mounting said drive aggregate on said auxiliary frame in a fourth transverse plane, said fourth plane lying outside the space between said first and second plane on the side of said second plane, said drive aggregate having its center of gravity near said fourth plane, and said fourth plane being spaced from said first plane a greater distance than said third plane, and means for elastically supporting said drive aggregate against rotation about a transverse axis lying in said fourth plane, said last-mentioned means being arranged in a fifth vertical transverse plane located near said first plane, and said driving aggregate being supported exclusively by said means in said fourth transverse plane and by said means in said fifth transverse plane independently from said main frame whereby no direct supporting connection exists between said drive aggregate and said main frame.

2. The combination according to claim 1, wherein said third plane coincides substantially with said second plane.

3. The combination according to claim 1, wherein said auxiliary frame is substantially U-shaped and surrounds said drive aggregate from the side of the vehicle end thereof with the cross portion of the U-shaped auxiliary frame extending in the direction towards said first plane and the arm portions of the U-shaped auxiliary frame extending in the direction towards said fourth plane, wherein said first-named means for elastically mounting said drive aggregate are provided near the free ends of said arm portions, said wheels support themselves against a middle part of the arm portions of said U-shaped auxiliary frame in said third plane, and wherein said last-named means is located in the region of the transverse portion of said auxiliary frame 4. In a motor vehicle, the combination according to claim 1, wherein the means for connecting said auxiliary frame with said main frame comprises rubber bumpers stressed in compression, and the means for mounting said drive aggregate on said auxiliary frame comprises rubber bumpers stressed substantially tangentially in a vertical plane.

5. The combination according to claim 1, said last-named means comprising a supporting arm fastened to said drive aggregate and extending substantially in the longitudinal direction of the vehicle, and means for elastically connecting said supporting arm with said auxiliary frame in the region of the transverse portion of said auxiliary frame.

6. The combination according to claim 3, wherein said auxiliary frame consists essentially of a U-shaped hollow bearer member and a bracket member welded to said bearer member, and wherein said bracket member forms part of the elastic means for connecting said auxiliary frame to said main frame in said first plane, and wherein the arm portions of the U-shaped auxiliary frame serve as the means for connecting the auxiliary frame with said main frame in said second plane as well as the means for supporting the wheels in said third plane and as means for mounting said drive aggregate in said fourth plane.

7. In a motor vehicle a main frame, an auxiliary frame, means for elastically connecting said auxiliary frame with said main frame in a first vertical transverse plane, means for elastically connecting said auxiliary frame with said main frame in a second vertical transverse plane spaced from said first plane, a pair of wheels opposite each other on different sides of the vehicle, means for supporting said wheels against said auxiliary frame in a third vertical transverse plane, a drive aggregate for the vehicle, means for elastically mounting said drive aggregate on said auxiliary frame in a fourth transverse plane, said fourth plane lying outside the space between said first and second plane on the side of said second plane, said drive aggregate having its center of gravity near said fourth plane, and said fourth plane being spaced from said first plane a greater distance than said third plane, and means for elastically supporting said drive aggregate against rotation about a transverse axis lying in said fourth plane, said last-mentioned means being arranged in a fifth vertical transverse plane located near said first plane, and said driving aggregate being supported exclusively by said means in said fourth transverse plane and by said means in said fifth transverse plane independently from said main frame whereby no direct supporting connection exists between said drive aggregate and said main frame, said auxiliary frame being substantially U-shaped and surrounding said drive aggregate from the sides of the vehicle end thereof with the cross portion of the U-shaped auxiliary frame extending in the direction toward said first plane and the arm portions of the U-shaped auxiliary frame extending in the direction toward said fourth plane, wherein said first-named means for elastically mounting said drive aggregate are provided near the free ends of said arm portions, said wheels support themselves against a middle part of the arm portions of said U-shaped auxiliary frame in said third plane, and wherein said means in said fifth vertical transverse plane is located in the region of the cross portion of said auxiliary frame, said first-named means for mounting said drive aggregate on said auxiliary frame comprising rubber bumpers, and said means in said fifth transverse plane including at least one bumper, said rubber bumpers responding substantially to shearing forces and said one bumper comprising at least one rubber member extending in the longitudinal direction of the vehicle and being stressed substantially tangentially.

References Cited in the file of this patent

UNITED STATES PATENTS

| 1,524,955 | Stahl | Feb. 3, 1925 |
| 1,948,745 | Curtiss | Feb. 27, 1934 |
| 2,027,898 | Broulhiet | Jan. 14, 1936 |
| 2,179,959 | Schroedter | Nov. 14, 1939 |
| 2,346,123 | Willson | Apr. 4, 1944 |
| 2,633,203 | Paton | Mar. 31, 1953 |
| 2,708,003 | Nallinger et al. | May 10, 1955 |

FOREIGN PATENTS

| 477,662 | Canada | Oct. 9, 1951 |
| 895,171 | France | Mar. 27, 1944 |
| 414,763 | Great Britain | Aug. 13, 1934 |
| 677,861 | Great Britain | Aug. 20, 1952 |